United States Patent [19]

Sloan

[11] Patent Number: 4,782,564
[45] Date of Patent: Nov. 8, 1988

[54] SAFETY RELEASE PIN FOR FIRE EXTINGUISHERS

[75] Inventor: Donald R. Sloan, North Aurora, Ill.

[73] Assignee: Pittway Corporation, Northbrook, Ill.

[21] Appl. No.: 77,808

[22] Filed: Jul. 27, 1987

[51] Int. Cl.[4] .................................... A62C 23/10
[52] U.S. Cl. ..................................... 24/704.1; 24/453; 24/616; 169/75; 403/2
[58] Field of Search ................ 24/704, 453, 297, 616, 24/16 PB; 292/307 R, 307 A, 318–322, 327; 169/75, 88; 222/153; 411/508, 913, 39, 42, 40; 403/2

[56] References Cited

U.S. PATENT DOCUMENTS

| | | |
|---|---|---|
| 1,964,013 | 5/1934 | Wenk . |
| 2,530,899 | 11/1950 | Mueller ........................... 292/307 R |
| 2,914,354 | 11/1959 | Moberg ............................ 292/307 R |
| 3,367,701 | 2/1968 | Wenk . |
| 3,402,435 | 9/1968 | Merser . |
| 3,600,027 | 8/1971 | Noland . |
| 3,666,016 | 5/1972 | Estes . |
| 3,702,637 | 11/1972 | Bower . |
| 3,814,298 | 5/1974 | Hansen . |
| 3,944,269 | 3/1976 | Lundberg . |
| 4,106,801 | 8/1978 | Neto ................................ 292/307 R |
| 4,248,462 | 2/1981 | Choi . |
| 4,299,417 | 11/1981 | McClure . |
| 4,658,481 | 4/1987 | Seyler and Sloan . |
| 4,658,955 | 4/1987 | Eichner ......................... 292/307 R X |
| 4,701,984 | 10/1987 | Wyckoff ........................... 24/697 X |

FOREIGN PATENT DOCUMENTS

| | | | |
|---|---|---|---|
| 2129288 | 12/1972 | Fed. Rep. of Germany ........ 169/75 |
| 282545 | 4/1952 | Switzerland ........................ 169/75 |

Primary Examiner—Kenneth J. Dorner
Assistant Examiner—James R. Brittain
Attorney, Agent, or Firm—Dressler, Goldsmith, Shore, Sutker & Milnamow

[57] ABSTRACT

A safety release pin for locking the operating mechanism of a fire extinguisher includes a shank having a blunt nose portion at one end thereof and having a portion of reduced diameter rearward of the nose portion defining parallel flat surfaces, and a pair of elongated locking members are pivotally mounted to the shank, each overlying a different one of the flat surfaces, and each defining a cam surface which coacts with surfaces of the operating mechanisms as the pin is inserted to pivot the locking members towards the flat surfaces to facilitate insertion, rearward movement being limited by projections on the undersurface of the locking members, maintaining interference betwen the locking members and the apparatus. When the pin is withdrawn, detent surfaces of the locking members coact with surfaces of the operating mechanism to rotate the locking members forwardly, severing the locking members from the shank.

14 Claims, 2 Drawing Sheets

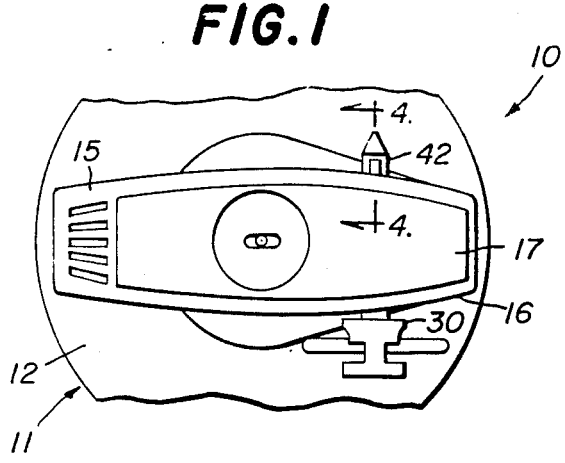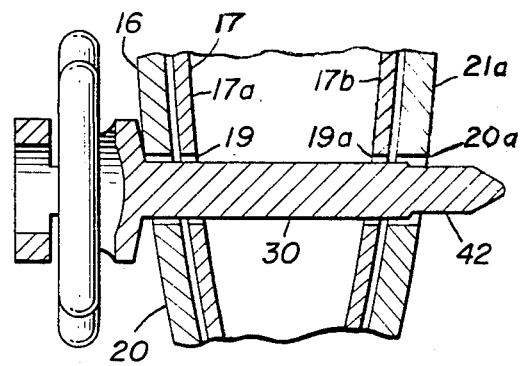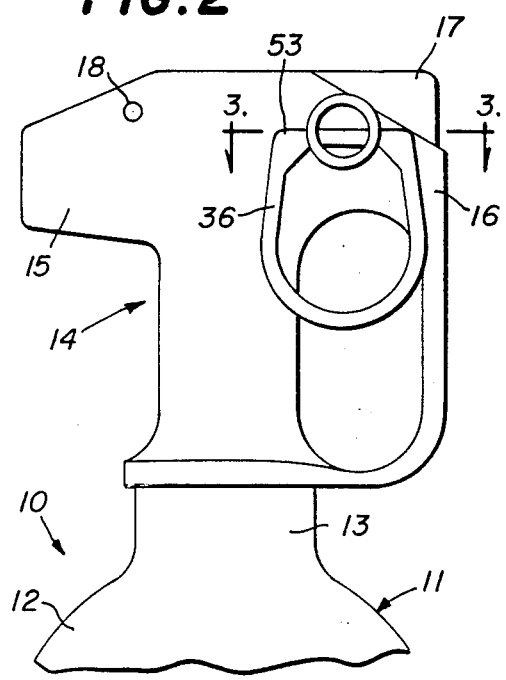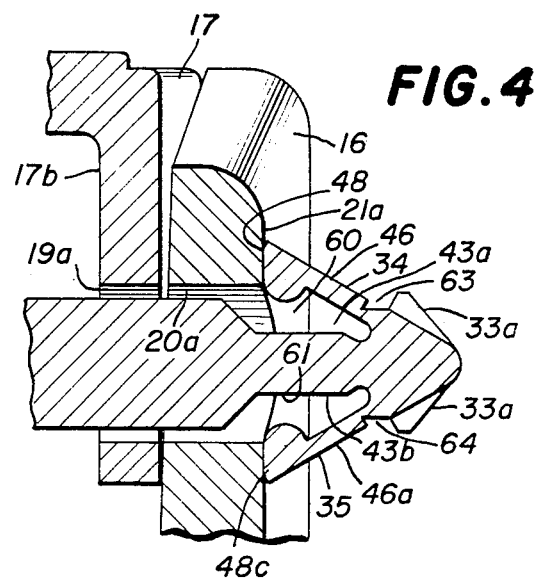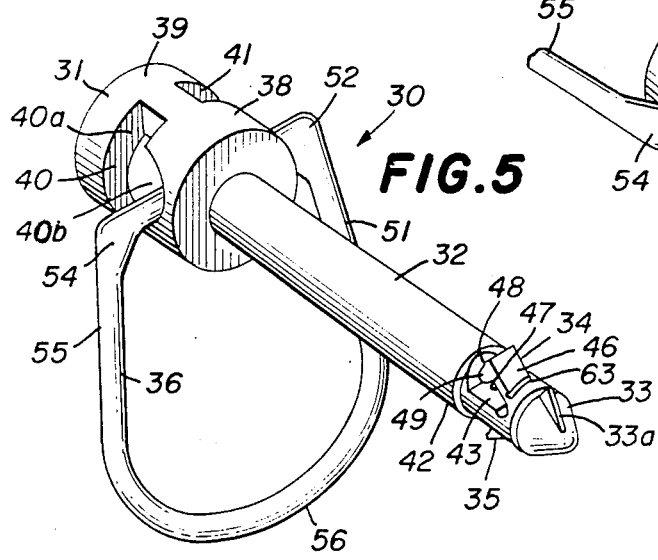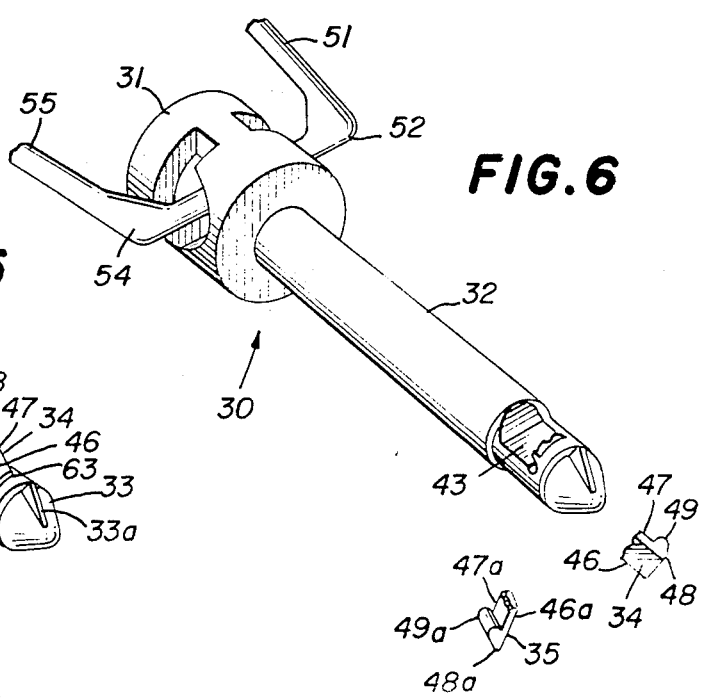

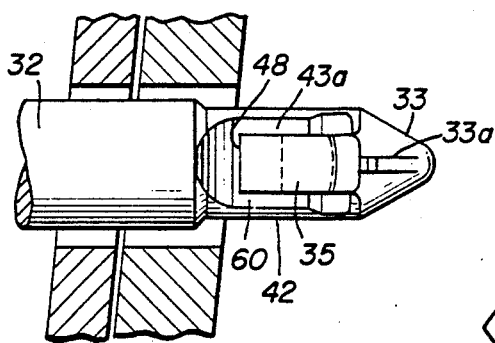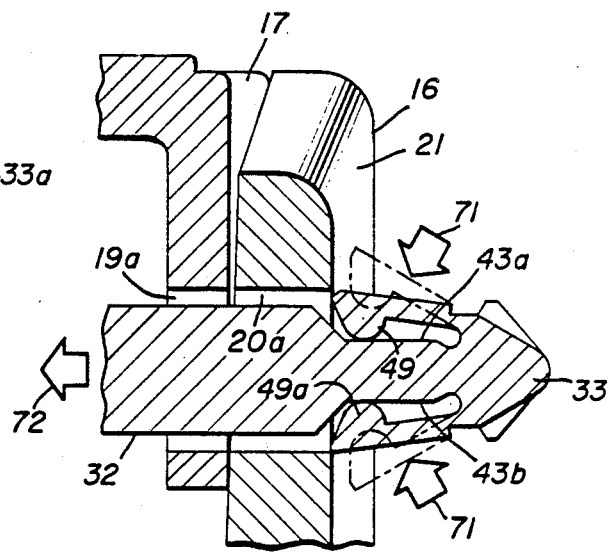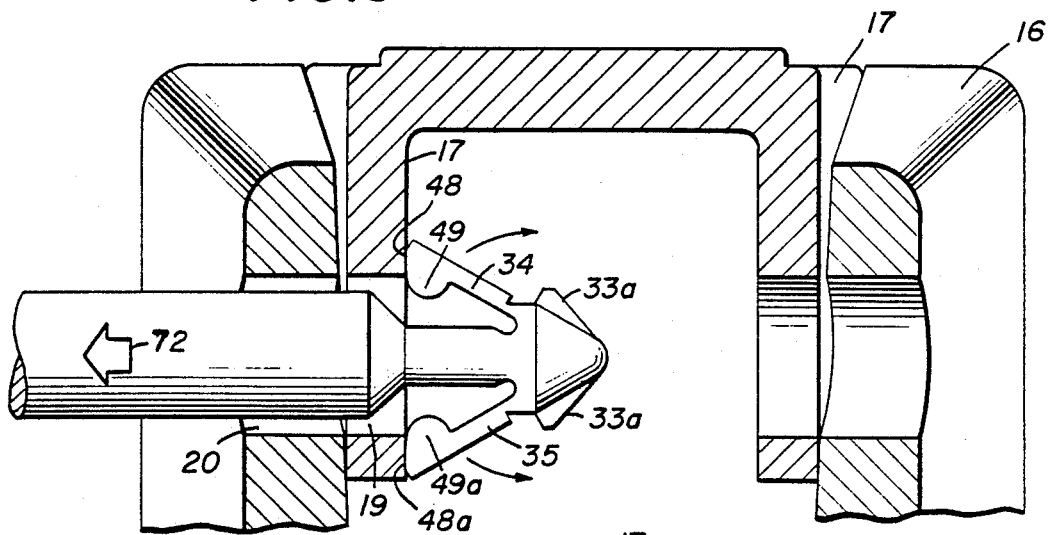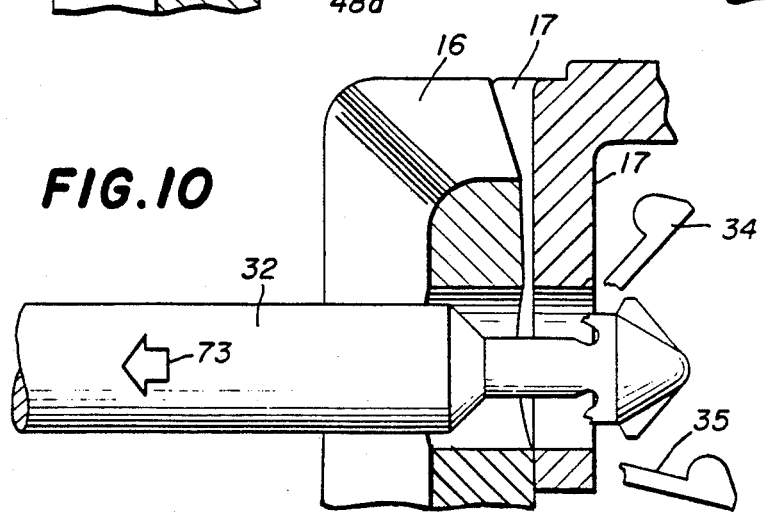

SAFETY RELEASE PIN FOR FIRE EXTINGUISHERS

BACKGROUND OF THE INVENTION

This invention relates to safety release pins for use with apparatus such as fire extinguishers and the like for preventing such apparatus from being operated until the pin is removed and for providing a visual indication as to whether or not the apparatus has been previously operated.

In U.S. Pat. No. 3,814,298 issued on June 4, 1974 to Arne Hansen, there is disclosed a safety release pin for use with apparatus such as a fire extinguisher, an insecticide sprayer and the like in which fluid or powder is confined and dispensed under pressure. The safety release pin is used to prevent accidental operation of the apparatus in that the release pin must be removed before the apparatus can be operated.

The release pin comprises a ring at one end and a locking structure at the other. The locking structure includes a pair of arms extending in a parallel spaced relationship, each having an outwardly projecting tab defining a cam surface. As the pin is inserted through openings in the fire extinguisher handle, the cam surfaces engage the peripheral edge of the openings, flexing the arms toward one another. After the tabe clear the openings in the fire extinguisher handle, the arms spring back to their locking position. When it is desired to use the fire extinguisher, the pin is pulled by the ring and fracture occurs at a weakened section of the arms at the rearward edge at least one of the cam surfaces, the tab breaks off at the weakened section of the arm. If both tabs break off, and if the pin is then inadvertently reinserted into the fire extinguisher handle, the lack of tabs on the pin will indicate that the apparatus has previously been operated.

However, in some instances, only one of the two arms may break off as the pin is removed. With one arm intact, the pin could be inadvertently reinserted into the handle of the fire extinguisher and the remaining arm could lock the pin in place and conceal the fact that tampering or previous use has occurred.

More importantly, because the tabs define the forward tip of the pin, and are capable of being squeezed together to the extent where their cam surfaces clear the peripheral edge of the openings, the pin could be removed without its tabs being broken off, and subsequently reinserted. Thus, a person could tamper with a fire extinguisher having a release pin of this construction without leaving any evidence to that affect.

SUMMARY OF THE INVENTION

It is a general object of the invention to provide an improved safety release pin.

Another object of the invention is to provide a safety release pin having an improved breakaway construction which resists breakage during normal handling but which readily tears apart upon intentional removal of the pin.

A further object of the invention is to provide an improved safety release pin of the breakaway type which provides a definite indication of tampering or previous removal of the pin the apparatus with which it is used.

The present invention provides a safety release pin comprising, a head portion, a cylindrical shank including a nose portion and locking means, the shank extending from the head portion with the free end of the shank terminating in the nose portion, the shank having a portion of reduced diameter rearwardly of the nose portion including at least one flat surface extending axially of said shank, the locking means including a locking member having a fixed end formed integrally with the shank and a free end extending in cantilever fashion rearward of the nose portion in overlying relation with the flat surface and pivotal relative thereto, the locking member having a transverse groove formed therein near its fixed end defining a weakened section for said locking member and projection means on one of the locking member and the flat surface for limiting pivotal movement of the locking member rearwardly and towards the flat surface, the locking member defining a detent surface near its free end which extends generally normal to the axis of the shank whereby a force applied to the detent surface tends to pivot the locking member about a pivot axis extending parallel to said groove, forwardly and away from the flat surface of the shank, for severing the locking member from the shank along a fracture line defined by the weakened section.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary top plan view of a fire extinguisher incorporating a dispensing apparatus, and including a safety release pin provided in accordance with and embodying the features of the present invention for preventing inadvertent operation of the dispensing apparatus;

FIG. 2 is a fragmentary side elevation view of the fire extinguisher including the safety release pin of the present invention;

FIG. 3 is a view in horizontal section taken along the line 3—3 of FIG. 2;

FIG. 4 is a view in vertical section taken along the line 4—4 of FIG. 1;

FIG. 5 is a perspective view of the safety release pin provided by the invention;

FIG. 6 is a perspective view of the safety release pin showing the locking ears broken off;

FIG. 7 is a fragmentary top plan view illustrating the safety release pin in its locking position in an actuating mechanism of the fire extinguisher; and FIGS. 8–10 illustrate the manner in which the safety release pin cooperates with the valve assembly to self-destruct during removal of the safety release pin from the actuating mechanism.

DESCRIPTION OF THE PREFERRED EMBODIMENT

The safety release pin of the present invention is described with reference to an application for preventing inadvertent operation of a fire extinguisher by locking the operating mechanism of the fire extinguisher. With reference to FIGS. 1-4 of the drawings, there is illustrated, a fire extinguisher, generally designated by the numeral 10, including a container 11 for holding fire extinguishing material under pressure. The fire extinguisher 10 may be of the type disclosed in the U.S. Pat. No. 4,619,328 of Gerard Seyler et al., entitled Fire Extinguisher Valve with Pressure Indicator. Preferably, the fire extinguishing material is a dry chemical extinguisher comprising a dry powder and a pressurized impelling gas for expelling the powder from the container. However, it will be appreciated that the locking pin of the present invention could be used with other types of fire extinguishers or other types of dispensing apparatus.

The container 11 includes a bottle-shaped shell 12 having an internally threaded neck 13 at one end thereof defining a circular outlet opening, upon which is mounted a dispenser assembly 14. The dispenser assembly 14 includes a nozzle 15 which is integral therewith and projects laterally therefrom and has a nozzle bore (not shown) which communicates with the interior of the shell 12 through a passageway. A valve assembly (not shown) is located within the passageway and is normally closed to block the flow of extinguishing material to the nozzle 15.

A fixed handle 16 projects laterally from the side of the dispenser assembly 14. An actuating lever 17 for the valve has one end thereof pivotally connected to the dispenser assembly 14 by a pin 18 for pivotal movement between a normal rest position, illustrated in FIG. 2, and an actuating position in which the actuating lever 17 operates the valve. Formed through inner wall surfaces 17a and 17b of the actuating lever 17 adjacent to the distal end thereof are apertures 19 and 19a, respectively, which are adapted for coaxial alignment with like apertures 20 and 20a formed through surfaces 21 and 21a of the fixed handle 16 for receiving the safety release pin 30 for holding the actuating lever 17 at its normal rest position and preventing movement thereof to the actuating position.

Referring to FIG. 5, the safety release pin 30 includes a head portion 31, a shank 32, including a nose portion 33 and two locking ears 34 and 35 and a pull ring 36. The locking ears retain the safety release pin in place in the dispenser assembly, as will be shown. The safety release pin 30, including the pull ring 36, is preferably molded from a suitable plastic material which has good strength characteristics but yet is also somewhat brittle.

The head portion 31 comprises a hollow cylinder having a closed end 38 and an open end 39 and a pair of opposing circumferentially extending apertures 40 and 41 formed in its side walls. Each aperture, such as aperture 40 includes a generally rectangular slot portion 40a and a semi-circular portion 40b.

The shank 32, which is generally cylindrical, extends from the head portion 31 with the free end 42 of the shank 32 terminating in the nose portion 33. The shank 32 has a portion 43 of reduced diameter rearwardly of the nose portion 33. The nose portion 33 is generally conical in shape and has a pair of triangular shaped fins 33a, extending normal to its forward surface at diametrically opposed positions along its forward surface. The locking ears 34 and 35 are formed integrally with and project from the base of the conical nose portion 33 at diametrically opposed positions along the periphery thereof, and are pivotable relative to the nose portion to facilitate insertion of the safety release pin into the dispenser assembly. In the normal or at-rest position, the locking ears extend rearwardly and outwardly, overlying the reduced diameter portion 43 of the shank 32 in a spaced relationship therewith.

Referring to FIGS. 4 and 5, locking ear 34 is generally rectangular in shape with an outer surface 46, an inner surface 47, and a detent surface 48 defined by the rearward edge of a boss 49 depending from its inner surface. Locking ear 35 is identical in shape with locking ear 34 and has a outer surface 46a, inner surface 47a, and a detent surface 48a defined by the rearward edge of a boss 49 depending from its inner surface.

The pull ring 36 includes five generally straight segments 51-55 and an arcuate segment 56, the segments being formed integrally in end-to-end relationship to provide a loop with a flat segment 53 extending through the apertures 40 and 41 in the head portion 31 and the arcuate segment 56 defining a semi-circular gripping portion. In the normal use position, the safety release pin 30 is oriented as shown in FIGS. 2-5, with the flat segment 53 of the pull ring 36 extending generally horizontal, so that locking ear 34 projects upwardly from the upper surface of the shank 32 and locking ear 35 projects downwardly from the lower surface of the shank 32.

Considering the free end 42 of the shank 32 in more detail with reference to FIGS. 4, 5 and 7, the reduced diameter portion 43 has flat parallel opposing upper and lower surface 43a and 43b, respectively, and arcuate side surfaces 43c and 43d. The flat surfaces 43a and 43b define respective upper and lower recesses 60 and 61 rearwardly of the base of the conical nose portion 33.

In its normal or at-rest position, the locking ear 34 extends rearwardly outward at an angle of about 30° relative to the flat upper surface 43a. The free end of the locking ear 34 is spaced away from the flat upper surface 43a and detent surface 48 is oriented generally vertically. The boss 49 is generally cylindrical in shape but has its rearward surface flattened defining the detent surface 48. A transverse notch 63 is provided at the base of the locking ear 34 defining a weakened section for the locking ear 34. The weakened section permits the locking ear to pivot rearwardly from its at-rest position to facilitate insertion of the safety release pin in the operating mechanism. The weakened section also permits the locking ear 34 to pivot forwardly from its at-rest position and to break away from the safety release pin during removal of same from the operation mechanism.

More specifically, with reference to FIGS. 3-5, during insertion of the safety release pin into the operating mechanism of the fire extinguisher, the locking ear 34 pivots rearwardly about a pivot axis extending transversely through the weakened section at the base of locking ear 34, towards the flat surface 43a. The projection 49 limits the rearward pivotal movement of the locking ear 34 to maintain the locking ear in an interferring state with surfaces of the operating mechanism. Also, the projection 49 limits the extent to which the locking ear 34 can be deflected to prevent the locking ear from taking a "set" which could prevent the locking ear from springing outwardly upon release after being depressed into engagement with the shank.

The upper surface 46 of the locking ear 34 slopes downwardly from the free end to the base of the locking ear, defining a forward cam surface. This cam surface coacts with the peripheral surface of apertures 19 and 19a and 20 and 20a through actuating lever 17 and fixed handle 16 to pivot the rearwardly projecting locking ear 34 rearwardly about its pivot axis during insertion of the safety release pin 30 into the aligned apertures of the dispenser assembly 14 to facilitate insertion of the safety release pin. When the safety release pin 30 is pushed all the way into position with its free end 42 extending beyond aperture 20a, locking ear 34 springs back to its normal position. The detent surface 48 engages the outer surface 21a of the fixed handle 16 to maintain the safety release pin 30 in place.

The weakened section also defines a fracture line allowing the locking ear 34 to break away from the safety release pin when the locking ear 34 is pivoted forwardly during removal of the safety release pin from the operating mechanism of the fire extinguisher.

Similarly, locking ear 35 extends rearwardly outward at an angle of about 30° relative to the flat lower surface 43b with its free end spaced away from the surface 43b and its detent surface 48a oriented generally vertical. The boss 49a which projects upward from locking ear 35 is also generally cylindrical in shape with its rearward surface flattened defining the detent surface 48a. The base of the locking ear 35 has a transverse notch 64 which defines a weakened section for the locking ear 35 pivoted about a pivot axis rearwardly and upwardly into recess 61. The boss 49a limits pivotal movement of the locking ear 35 to maintain the locking ear in interferring relation with the operating mechanism. Also, the weakened section defines a fracture line allowing the locking ear 35 to break away from the safety release pin with forward, clockwise, pivoting of the locking ear 35 during removal of the safety release from the operating mechanism of the fire extinguisher.

In one construction for the safety release pin 30, the shank 32 had a diameter of 0.180 inches and the thickness of the reduced diameter section between flat surfaces 43a and 43b was 0.075 inches. Axial length of each locking ear was 0.150 inches and the height from the top surface to the bottom of the projection was 0.060 inches. The depth of each groove 60 and 61 was sufficient to reduce the thickness of the web to 0.012 inches.

Referring to FIGS. 1-4, to insert the safety release pin 30, the spertures 20, 20a and 19, 19a in the fixed handle 16 and the actuating lever 17, respectively, of the dispenser assembly 14 are aligned and the nose portion 33 of the safety release pin is pushed through one of the pairs of aligned apertures. As the free end 42 of the safety release pin 30 passes through the apertures, the outer cam surfaces 46 and 46a of the two locking ears 34 and 35 engage peripheral surfaces of the aperture 20 in the fixed handle 16, and the locking ears 34 and 35 are pivoted counterclockwise inwardly towards the shank. The locking ears 34 and 35 remain pivoted as the safety release pin passes through the aligned apertures 20 and 19 and 19a, 20a on each side of the fixed handle and as the nose portion 33 is pushed through the last aperture 20a, the locking ears spring back to then normal positions (FIG. 4) with their respective detent surfaces 49 and 49a engaging the surface 21 adjacent to aperture 20a in the fixed handle 16.

When it is desired to use the fire extinguisher 10, the safety release pin 30 is pulled causing the generally vertical detent surfaces 49 and 49a of the two locking ears to engage the surface 21a adjacent to the aperture 20a. Then, with continued pulling of the safety release pin 30, the ears of the safety release pin 30 pivot clockwise about an axis, applying a force to the weakened section of the locking ears. Consequently, the ears 34 and 35 break off from the nose at the two fracture locations defined by grooves 63 and 64 so that the ears completely break off as illustrated in FIG. 6. After the safety release pin 30 has been removed, the use can operate the actuating lever 17, depressing the lever to the actuating position for operating the valve to its open condition to permit the flow of extinguishing material from the container 11 outwardly through the nozzle 15.

The safety release pin cannot be removed without breaking off the locking ears 34 and 35. Once that is done, and the pin is reinserted, a subsequent user can tell that the fire extinguisher has been tampered with because of the absence of locking ears.

Referring to FIGS. 8-10, if someone wanted to tamper with the fire extinguisher, the person could press the locking ears toward one another, in the direction of arrows 71 in FIG. 8, until the projections 49 and 49a engage the respective flat surfaces 43a and 43b as shown by the solid line in FIG. 8. The pin can be withdrawn in the direction of arrow 72. However, inside the valve, the locking ears 34 and 35 will spring back to their unstressed condition as shown in FIG. 9, and will engage the inside wall 17a in the valve housing to preclude further removal without damaging the locking ears. Thus, further movement of the pin in the direction of the arrow 73 in FIG. 10, will result in the locking ears 34 and 35 being pivoted forwardly towards the nose 33 until the locking ears 34 and 35 break off as illustrated in FIG. 10.

Thus, the projections on the locking ears limit the extent to which the locking ears can be pivoted away from the nose 33 toward the shank far enough to enable the locking ears to become "set" such that they would not spring back to their normal at-rest position. Thus, the locking pin cannot be removed without breaking off the locking ears. Once the locking ears are broken off and should the safety release pin be reinserted, the subsequent user would be alerted to the fact that the fire extinguisher had been tampered with because of the absence of the locking ears.

I claim:

1. A safety release pin comprising a head portion and a cylindrical shank including a nose portion and locking means, said shank extending from said head portion with the free end of said shank terminating in said nose portion, said shank having a portion of reduced diameter rearwardly of said nose portion including at least one flat surface extending axially of said shank, said locking means including a locking member having a fixed end formed integrally with said shank and a free end extending in cantilever fashion rearwardly of said nose portion in overlying relation with said flat surface and pivotal relative thereto, said locking member having a transverse groove formed therein near its fixed end defining a weakened section for said locking member, and projection means on one of said locking member and said flat surface for limiting pivotal movement of said locking member rearwardly and towards said flat surface, said nose portion including fins secured thereto with one fin being associated with each said locking member and extending radially outwardly beyond said groove in the associated locking member, said locking member defining a detent surface near its free end which extends generally normal to the axis of said shank whereby a force applied to said detent surface tends to pivot said locking member about a pivot axis extending parallel to said groove, forwardly and away from said flat surface of said shank, for severing said locking member from said shank along a fracture line defined by said weakened section.

2. A safety release pin according to claim 1, wherein said reduced diameter portion of said shank defines first and second flat surfaces extending in a parallel spaced relationship and said locking means includes first and second locking members each extending in cantilever fashion overlying respective ones of said first and second flat surfaces.

3. A safety release pin according to claim 2, wherein each of said locking members has its fixed end formed integrally with a rearward surface of said nose portion and said locking members are located at diametrically opposed positions along the periphery of said nose portion.

4. A safety release pin according to claim 2, wherein each of said locking members defines a cam surface which slopes inwardly from its free end towards its fixed end receiving a force for pivoting said locking member rearwardly towards the flat surface it overlies.

5. A safety release pin according to claim 2, wherein said projection means for each of said locking members comprises a generally cylindrical shaped transversely extending projection on the under surface thereof near its free end, said projection having a rearward surface flattened defining said detent surface at the rearwardmost end of said locking member.

6. A safety release pin according to claim 1, wherein said head portion includes a generally cylindrical extension of said shank having a transverse slot therethrough and a pull ring extending through said slot.

7. A safety release pin comprising, a head portion and a shank including a nose portion and locking means, said shank extending from said head portion with the free end of said shank terminating in said nose portion, said shank having a portion of reduced diameter rearwardly of said nose portion defining first and second opposing flat generally parallel surfaces extending axially of said shank, said locking means including first and second elongated locking members each having a fixed end and a free end, each said locking member extending axially of said shank with its fixed end formed integrally with said shank rearwardly of said nose portion, said first and second locking members extending in cantilever fashion in overlying relationship with said first and second flat surface respectively, and pivotal relative thereto, each locking member having a transverse groove near its fixed end defining a weakened section for said locking member and projection means on said free end of said locking member and located to engage said flat surface with pivotal movement of said locking member rearwardly towards said flat surface to limit rearward pivotal movement of said locking member, said nose portion including fins secured thereto with one fin being associated with each said locking member and extending radially outwardly beyond said groove in the associated locking member, and said projection means defining a detent surface which extends generally normal to the axis of said shank whereby a force in a direction axially of said shank applied to said detent surface tends to pivot said locking member about a pivot axis extending parallel to said groove, forwardly and away from said flat surface of said shank for severing said locking member from said shank along a fracture line defined by said weakened portion.

8. A safety release pin according to claim 7, wherein each of said locking members defines a cam surface which slopes inwardly from its free end towards its fixed end for receiving a force for pivoting said locking member rearwardly towards the flat surface that it overlies.

9. A safety release pin according to claim 7, wherein said projection means for each of said locking members comprises a generally cylindrical shaped projection extending transversely of the locking member on the undersurface thereof near its free end, said projection having a rearward surface flattened defining said detent surface.

10. A safety release pin for use with apparatus for preventing inadvertent operation of the apparatus, the apparatus including an operating member movable from a first position to a second position for operating the apparatus, said operating member including an aperture through a surface thereof which is aligned with a further aperture in a surface of the apparatus when the operating member is in said first position to receive said safety release pin allowing said safety release pin to lock said apparatus in an unoperated condition, said safety release pin comprising, a head portion and a cylindrical shank including a nose portion and locking means, said shank extending from said head portion with the free end of said shank terminating in said nose portion, said shank having a portion of reduced diameter rearwardly of said nose portion defining first and second flat surfaces extending axially of said shank, said locking means including first and second elongated locking members each formed integrally with said shank rearwardly of said nose portion and each of said locking members including a cam surface which coacts with a first one of the apertured surfaces during insertion of the pin into the apparatus to pivot said locking members rearwardly toward said reduced portion of said shank to facilitate insertion of the pin into the apparatus, a projection on the underside of each locking member and located to engage said flat surface with rearward pivotal movement of said locking member to limit rearward pivotal movement of said locking member, and each of said locking members defining a detent surface which extends generally normal to the axis of said shank, each locking member having a transverse groove near its fixed end defining a weakened section for the locking member whereby as the pin is withdrawn from the apparatus, the detent surfaces of said locking members coact with a second one of said apertured surfaces to apply a force in a direction axially of said shank to pivot said locking members forwardly about an axis extending parallel to said groove and away from said reduced diameter portion of said shank, thereby severing said locking members from said shank, said nose portion including fins secured thereto with one fin being associated with each said locking member and extending radially outwardly beyond said groove in the associated locking member.

11. A safety release pin according to claim 10, wherein each of said locking members has its fixed end formed integrally with a rearward surface of said nose portion and are located at diametrically opposed positions along the periphery thereof.

12. A safety release pin according to claim 11, wherein said cam surface for each of said locking members slopes inwardly from the free end of the locking member towards its fixed end for receiving a force for pivoting said locking member rearwardly towards the flat surface that it overlies.

13. A safety release pin according to claim 11, wherein said projection means for each of said locking members comprises a generally cylindrical shaped, transversely extending projection on the undersurface thereof near its free end, said projection having a rearward surface flattened defining said detent surface at the rearwardmost end of said locking member.

14. A safety release pin according to claim 11, wherein said head portion includes a generally cylindrical extension of said shank having a transverse slot therethrough and a pull ring extending through said slot.

* * * * *